Dec. 19, 1933.  L. P. GROBEL ET AL  1,940,301

SHAFT BEARING

Filed Oct. 23, 193

Inventors
Lloyd P. Grobel
Burt L. Newkirk
by *Charles V. Tullar*
Their Attorney.

Patented Dec. 19, 1933

1,940,301

UNITED STATES PATENT OFFICE 1,940,301

SHAFT BEARING

Lloyd P. Grobel and Burt L. Newkirk, Schenectady, N. Y., assignors to General Electric Company, a corporation of New York Application October 23, 1931. Serial No. 570,706

9 Claims. (Cl. 308—121)

The present invention relates to shaft bearings to which oil or like lubricant is supplied in sufficient quantity to produce complete fluid film lubrication.

It has been observed that shafts running in journal bearings at more than twice critical speed develop a vibratory or whirling disturbance. Also shafts running in journal bearings at less than twice critical speed but carrying light loads or loads changeable in direction have a tendency toward instability, and frequently develop vibratory disturbances. Changes in direction of load occur particularly with bearings supporting a shaft to which driving or driven gears are fastened. It will be readily understood that a driving gear meshing with a driven gear exerts a force on the driven gear which is transferred through the shaft to the bearing or bearings for the driven gear and forms with the static load acting on the bearing a resultant which presses the bearing shaft in a certain direction. If now one of the components, particularly that caused by the driving force, changes, it will cause a change of direction of the resultant. These changes, or light load, or both, cause in many cases instability or unstable behavior of the shaft which effects undesirable vibratory movements. The whirling or vibration to which shafts run in journal bearings are subject at more than twice critical speed has been called whipping.

The object of our invention is to provide an improved bearing construction which serves to prevent the whipping or whirling of the shaft.

For a consideration of what we believe to be novel and our invention, attention is directed to the following description and claims appended thereto in connection with the accompanying drawing which forms a part of the specification.

Figure 1:
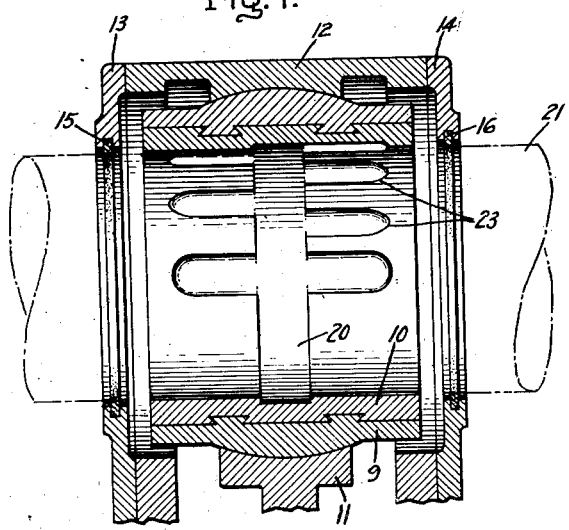
Figure 2:
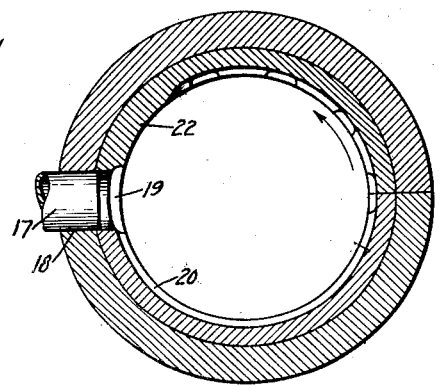
Figure 3:
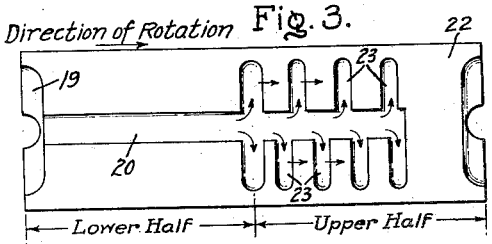

In the drawing, Figs. 1 and 2 represent by way of example a shaft bearing embodying our invention. Fig. 1 is a sectional view of a bearing and Fig. 2 is a cross section of Fig. 1. Fig. 3 is a development of the inner face of the bearing lining shown in Figs. 1 and 2. Figs. 4 to 8 inclusive are modifications embodying our invention.

Referring to the drawing, Figs. 1 to 3, 9 indicates a bearing having a lining 10 of suitable material. The bearing 9 is supported by a housing 11 comprising a removable cover 12. 13 and 14 designate two end plates forming a part of the housing and being provided with packings 15 and 16 respectively for preventing leakage along the shaft. The bearing block and the lining are preferably divided in a horizontal plane through the axis into an upper and a lower half. Oil or like lubricant is supplied to the shaft through a conduit 17 (Fig. 2) which is fastened in an opening 18 provided in the present instance near the horizontal plane through the axis of the bearing. 19 designates an axial groove or recess provided near a horizontal plane through the axis of the bearing for distributing the lubricant along the shaft. The arrangement so far described may be considered as typical for any rotary shaft bearing having a bearing lining and grooves or recesses for distributing oil or like lubricant. A bearing of this kind may operate satisfactorily so far as its lubrication is concerned, but experience has shown that at all speeds above twice the shaft critical speed or with light loads or with loads varying in direction, whipping or whirling or instability of the shaft takes place. These undesirable oscillations are partly affected by the supply of lubricant; for instance, it has been observed that the whirling of the shaft decreases if less oil is supplied. A decrease of oil supply, however, means an increase in wear of the bearing, and in many cases also a considerable increase in temperature thereof with serious danger of failure. This is not permissible for mechanical reasons.

In order to eliminate these drawbacks we provide, according to our invention, an improved system of grooves to control the flow of the oil or like lubricating and cooling means, especially in the upper half of the bearing whereby the shaft is forced against the load carrying region. This has been shown in Figs. 1 to 3, where 20 is a circumferentially extending groove or recess through which the oil is conveyed around the shaft, the latter being indicated at 21 in dotted lines. From the drawing it can be seen that groove 20 surrounds the shaft except for a short distance where a dam 22 is formed adjacent the opening 18. A plurality of grooves 23 in the upper half of the bearing extend axially from the central groove 20. The direction of oil flow through the grooves and along the bearing surface with respect to the direction of rotation of the shaft has been indicated by arrows in Fig. 3 which clearly brings out the relation between the oil supply and the different grooves. The axial grooves 23 in the present instance are provided in staggered relation with respect to the central groove 20 but this staggered relation is not essential. Regarding the operation of our improved shaft bearing it is stated that the circumferential groove ending in a dam develops a high, hydrodynamic pressure at the dam and extending backward therefrom in the groove due to the pumping action of the journal when running. The plurality of axial grooves in the upper part of the bearing causes a better distribution of this oil pressure in the upper half of the bearing. This acts like a bearing load, developing at increase of shaft speed, and effects a displacement of the shaft in a downward direction, resulting in a stabilization and accordingly a smoother running of the shaft under the assumption that the static force on the shaft acts downwardly. In cases where the static force acts in a direction other than vertically downward, the grooves will be provided accordingly such that the oil pressure will force the shaft approximately in the same direction as that of the static load. Whereas with horizontally arranged shafts the groove system according to our invention has to be provided in a certain relation with respect to the static load acting on the shaft, there is no corresponding relation with respect to vertically arranged shaft bearings and in the latter case the grooves may be provided as desired. If, however, a vertical shaft is normally forced in a certain direction for instance, due to a gear load, the groove system is provided such that it causes, due to the action of the oil pressure, a force on the shaft in substantially the same direction as the force caused by the gear load. Photographs taken of the center of the end of a horizontal shaft provided with an oil-controlling groove system, according to our invention, have proven that a downward movement of the shaft due to the action of the oil pressure takes place.

Figure 4:
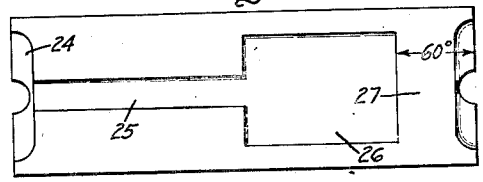

Instead of providing a plurality of axial grooves in the upper part of the bearing, as shown in Fig. 3, whereby adjacent axial grooves define lands therebetween, we may eliminate these lands to the effect that a single groove or recess extends over a substantial area of the upper part of the lining. This has been shown in Fig. 4 where 24 represents the axial groove to which the oil is supplied, 25 is a circumferential groove connected with groove 24, and 26 is a recess in the upper part of the bearing. 27 designates a dam defined between the end of the recess and the oil supply groove 24. Experiments have shown that it is preferable to provide the end of the recess or groove 26 in the upper part at a distance from the center of the oil supply groove 24 in the order of about 60°, as indicated in Fig. 4.

Figure 5:
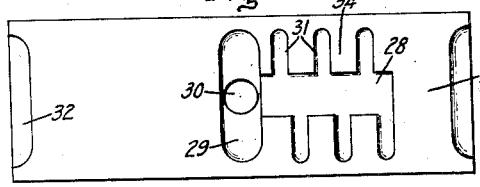
Figure 6:
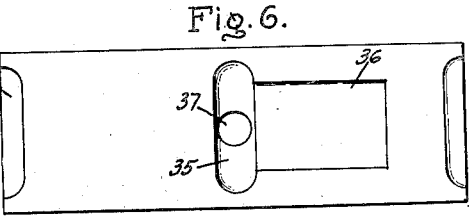

In Fig. 5 we have shown another groove system comprising a circumferential groove 28 which in this instance is provided in the upper bearing half only, an axial main groove or recess 29 to which the source of oil supply is connected through opening 30, and a plurality of axial grooves 31 in the upper half of the bearing, extending from groove 28 and provided in staggered relation with respect to the latter. 32 is another axial groove provided near the horizontal plane through the axis of the shaft and separated from the other grooves by a dam 33. Groove 32 causes spreading of the oil along the shaft before the oil reaches the load carrying region. The axial grooves 31 define lands 34 between adjacent grooves. In certain cases these lands may be eliminated by widening of the axial grooves whereby the latter form a wide recess in the upper bearing half which extends over a substantial area thereof. This has been indicated in Fig. 6 where 35 represents an axial groove corresponding to groove 29 of Fig. 5, and 36 is a recess in the upper bearing half. 37 designates an opening for supplying oil, and 38 another axial groove provided diametrically opposite the groove 35.

Figure 7:
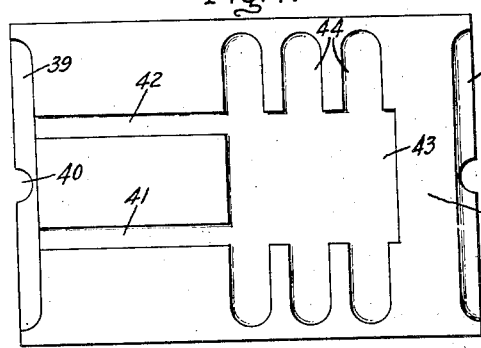

In Fig. 7 we have shown an arrangement which is particularly adapted for longer bearing linings. 39 is an axial groove provided with an opening 40 to which oil or like lubricant is supplied. 41 and 42 designate circumferential grooves which are symmetrically provided with respect to the bearing lining and which are connected to a wide recess 43 in the upper bearing half. 44 are axial grooves connected to recess 43, and 45 is a dam defined between the end of recess 43 and the oil supply groove 39.

Figure 8:
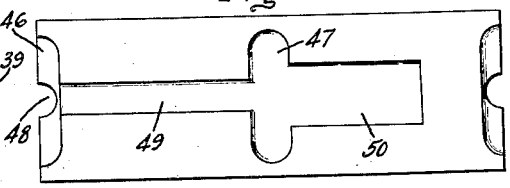

Fig. 8 is another simplified form in development of an oil flow controlling groove system, which comprises only two axial grooves 46 and 47 of which one is connected through opening 48 to the source of oil supply. 49 represents a circumferential groove which in the upper part of the bearing is wider than in the lower part thereof, as indicated at 50, and which connects the two diametrically arranged axial grooves 46 and 47 with each other and terminates at a short distance from the opposite side of groove 46 where a dam is formed. Such an arrangement may be used where little tendency toward whirling of the shaft occurs. When a maximum stabilizing effect is required it is advantageous to use a system similar to that of Figs. 1 to 3.

With our bearing arrangement which comprises an improved oil flow controlling system for bearings, we obtain smooth running of the shaft above twice critical speed, at which speed the well known whirling or whipping occurs with bearings of known design. Our bearing arrangement also results in stable operation at speeds less than twice critical speed in cases where instability would otherwise result from very light bearing loading or from variation in the direction of loading, due for example to unbalance of the rotor or to changing gear load which tends to lift the shaft.

What we claim as new and desire to secure by Letters Patent of the United States is:

1. In combination with a rotary shaft, a bearing having an axial recess in its bearing surface, means for supplying lubricant to the recess, and a centrally arranged circumferential groove having one end connected to the recess and another end defining a dam opposite the load-carrying region to build up oil pressure for stabilizing the shaft.

2. In combination with a rotary shaft, a bearing having an axial recess in its bearing surface, means for supplying lubricant to the recess, and a centrally arranged circumferential groove provided opposite the load carrying region of the bearing, one end of the circumferential groove being connected to the axial recess, the other end of the circumferential groove defining a dam opposite the load carrying region of the bearing whereby oil pressure is built up near the dam for stabilizing the shaft.

3. In combination with a rotary shaft, a bearing having an axial groove in its bearing surface, means for supplying oil to the groove, a circumferential groove extending from one side of the axial groove and terminating at a short distance from the other side of the axial groove, a dam being formed between the axial groove and the end of the circumferential groove opposite the load carrying region, and a plurality of additional axial grooves provided in the half opposite the load carrying region of the bearing and extending from the circumferential groove.

4. In combination with a rotary shaft, a bearing having an axial groove in its bearing surface, means for supplying oil to the groove, a groove extending in circumferential direction from one side of the axial groove and terminating at a short distance from the other side of the axial groove defining a dam between the axial groove and the end of the circumferential groove opposite the load carrying region, and a plurality of additional grooves provided in the upper half of the bearing and extending from the circumferential groove, the latter being provided in the center of the bearing and the additional axial grooves being provided in staggered relation with respect to the circumferential groove.

5. In combination with a rotary shaft, a bearing having an axial groove provided near the horizontal plane through the axis of the bearing, means for supplying oil to the axial groove, a circumferential groove extending from the axial groove near the center of the upper half of the bearing, and a plurality of additional axial grooves extending from the circumferential groove, the other end of the circumferential groove defining a dam opposite the load carrying region for building up oil pressure to stabilize the shaft.

6. In combination with a rotary shaft, a bearing, said bearing being vertically loaded in downward direction and having a lining provided with an axial groove near the horizontal plane through the shaft, a recess extending over a large area of the upper part of the bearing lining, a plurality of symmetrically arranged circumferentially extending grooves connecting the first named groove with one end of the recess, the other end of the recess defining a dam, and means for supplying oil to the first named groove whereby oil pressure is built up near the dam for stabilizing the shaft.

7. In combination with a rotary shaft, a bearing having in the region opposite the load-carrying regions of the bearing a circumferentially extending central groove, means for supplying lubricant to one end of the groove, the other end of the groove defining a dam adapted to build up oil pressure for forcing the bearing against the load-carrying region whereby the shaft is stabilized.

8. The combination with a rotary shaft, a bearing having a circumferentially extending groove provided near the center of the bearing, means for supplying lubricant to one end of the groove, the other end of the groove terminating before the first named end at a distance in the order of 60 angular degrees and defining a dam for building up oil pressure opposite the load carrying region to stabilize the shaft.

9. The combination with a rotary shaft, a bearing having two oppositely arranged axial grooves, means for supplying oil to one of the axial grooves, a circumferential groove connecting the two axial grooves with each other and terminating at a distance of the order of 60 angular degrees ahead of the oil supply groove and defining a dam opposite the load carrying region, the circumferential groove being widened in the region opposite the load-carrying region.

LLOYD P. GROBEL.
BURT L. NEWKIRK.